Feb. 12, 1929.   A. L. RUTHVEN   1,701,592
SIMPLEX CONTINUOUS INDUCTION INTERMITTENT TRAIN CONTROL
Filed Aug. 30, 1924   2 Sheets-Sheet 1

Inventor
A. L. RUTHVEN,
By Monroe E. Miller
Attorney.

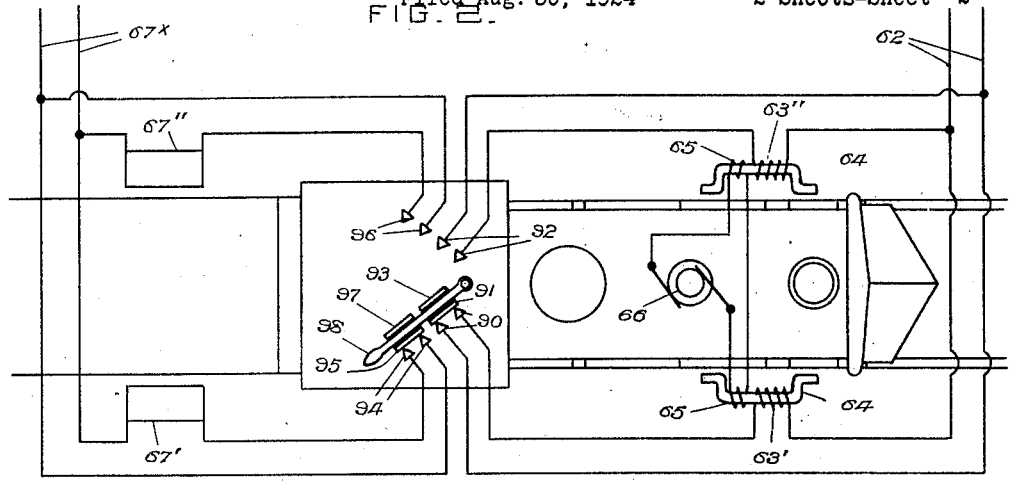

Patented Feb. 12, 1929.

1,701,592

UNITED STATES PATENT OFFICE.

ALFRED L. RUTHVEN, OF ROCHESTER, NEW YORK, ASSIGNOR TO UNION SIMPLEX TRAIN CONTROL CO., INC., OF ROCHESTER, NEW YORK, A CORPORATION OF DELAWARE.

SIMPLEX CONTINUOUS-INDUCTION INTERMITTENT TRAIN CONTROL.

Application filed August 30, 1924. Serial No. 735,159.

The present invention relates to automatic train control, and aims to provide a novel and improved apparatus of that kind which is comparatively simple in construction and moderate in cost, in addition to being practical and efficient in operation.

Another object of the invention is the provision of automatic train control apparatus utilizing continuous induction between the train or vehicle and the track to keep the train running, with intermittent control between the track or road-way and the train or vehicle at control stations or locations, in order that the train or vehicle equipment can be set for different conditions, such as clear, caution and danger, when passing the control stations, depending on traffic conditions or wayside signals.

A further object is the use of a non-magnetic rail section at each control station of the track, with a rail-responsive inductive element on the train or vehicle to maintain running conditions (either clear or caution) when travelling between or beyond control stations and for interrupting such control and obtaining danger or emergency conditions when passing a nonmagnetic rail section at a control station, in combination with traffic controlled means at the control stations for supplying electrical energy, and means on the train or vehicle for picking up the energy at control stations for obtaining running conditions, such as clear or caution, if the required energy is received from the track means, so that failures will be on the side of safety. Thus, the non-magnetic rail section at each control station will assure of a break in the inductive relation between the vehicle equipment and the track whenever passing a control station, to result in a danger or emergency condition, unless the required energy is received by the vehicle equipment from the track means, when passing the control station, to obtain either caution or clear conditions, and failure of electrical current or energy, short circuits, grounds, and the like, resulting in the stopping or retarding of the train or vehicle.

A further object is to reduce to the most simple construction the cooperable elements between the track and the train or vehicle, thereby not only reducing the cost of installation, but also eliminating ramps, trips, and other contact devices or obstructions on the track or vehicle, as well as providing for efficient and dependable cooperation between the track and vehicle elements. The responsive elements of the vehicle equipment may be fixed in relation to the vehicle, without movable parts with reference to the vehicle, other than relays or other translating means controlled by said elements, and the track element may be a rail of the track itself, without any other device or element on the track for cooperation with the responsive elements of the vehicle, thereby eliminating ramps, trips, inductors and all other obstructions on the track or road-way. The responsive elements on the vehicle may also be located immediately over a rail so as to be maintained in proper inductive relation with the rail, and to be protected behind the wheels of the vehicle so as not to be knocked off or damaged, by being shielded from encountering or contacting with objects on the track.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Fig. 2 is a diagrammatical view of the means for reversing connections with responsive elements at the opposite sides of the locomotive or vehicle.

Fig. 3 is a diagrammatical view illustrating modifications.

Fig. 4 is a diagrammatical view depicting an arrangement for preventing false stops at non-magnetic railroad crossings and other non-magnetic portions of the track.

Figure 1:
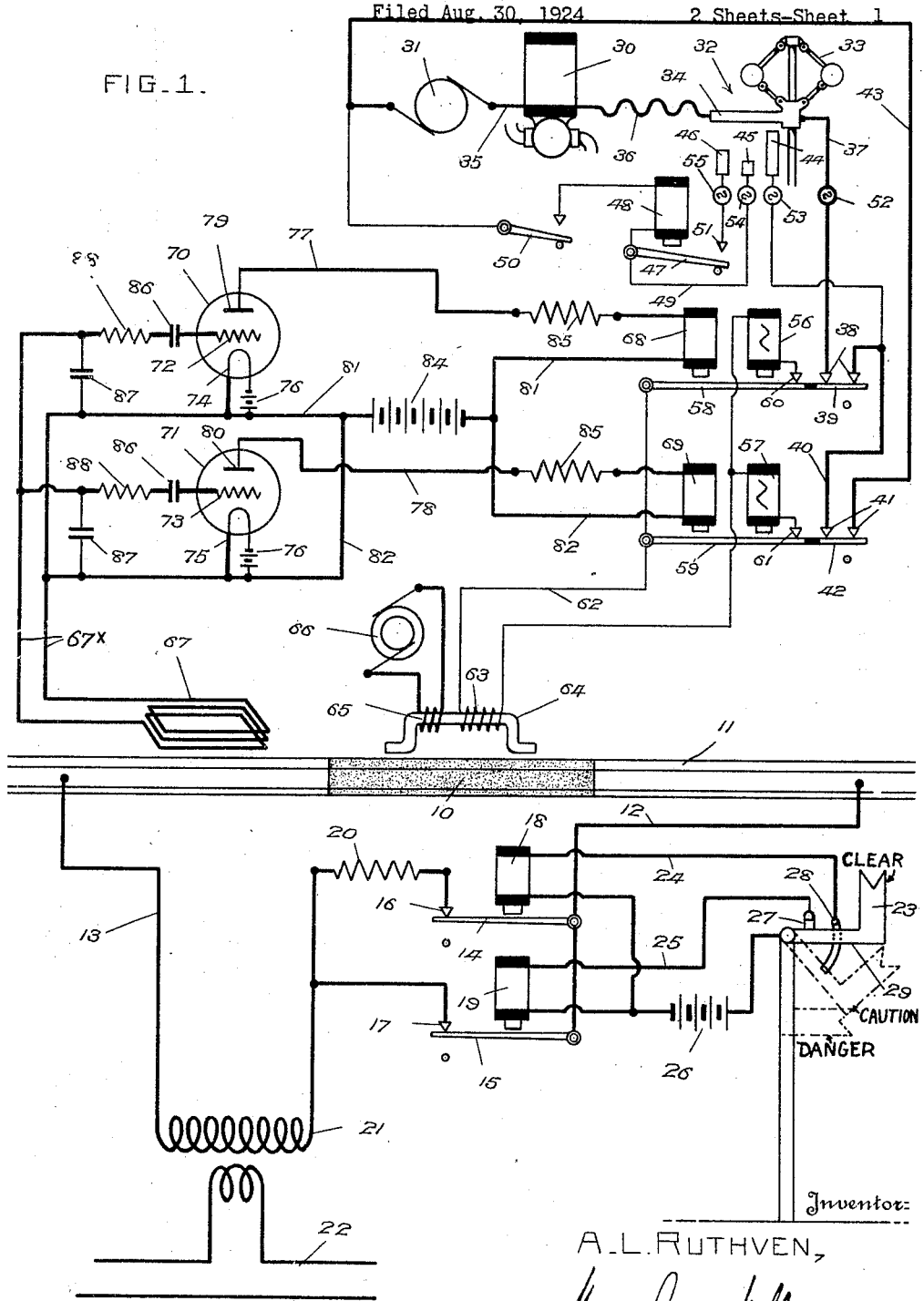
Figure 1 is a diagrammatical view of the improved apparatus.

Track equipment.

In carrying out the invention, a manganese or other non-magnetic rail section 10 is disposed in one rail of the track at each control station or location, in order to obtain inductive interruption between the vehicle and track whenever passing a control station, and said rail section may be the usual rail length (33 feet).

Electrical current is passed through or along the rail 11 at the control station for supplying energy to be picked up by the vehicle equipment for obtaining running conditions, either caution or clear. For this purpose, conductors 12 and 13 are electrically connected with the rail 11 at a distance apart for the flow of current along the rail between said conductors, and they are preferably connected to the rail at distances beyond the opposite ends of the non-magnetic rail section 10. The flow of current through the conductors 12 and 13 and rail 11 is controlled by relays including the switches 14 and 15 which are closed against the respective contacts 16 and 17 by electro-magnets 18 and 19 when said magnets are energized. The contacts 16 and 17 are connected with the conductor 13, and suitable resistance 20 is interposed between the contact 16 and conductor 13. The conductor 13 includes the secondary winding 21 of a transformer by means of which alternating or pulsating current is induced into the track circuit from the supply line 22 which is provided for supplying the electrical energy from an electrical generator (not shown). The switch 15 is connected in parallel or multiple with the switch 14 and resistance 20, and when either or both of the switches are closed the alternating current will flow through the conductors 12 and 13 and rail 11 to energize the rail at the control station so that energy can be picked up by the vehicle equipment to offset or set aside the danger condition that would otherwise be established when passing the non-magnetic rail section.

The electro-magnets 18 and 19 are controlled by any suitable means according to traffic conditions, whereby the magnet 19 is deenergized and the magnet 18 energized under caution conditions, both magnets deenergized under danger conditions, and both magnets energized under clear conditions. As shown, the magnets are controlled from a semaphore 23. Circuits 24 and 25 of the magnets 18 and 19, respectively, include the battery 26 or other source of electrical energy, and the respective contacts 27 and 28 cooperable with a switch 29 included in both circuits. When the semaphore 23 is in clear position, the switch 29 engages both contacts 27 and 28, so that both magnets 18 and 19 are energized. When the semaphore is in caution position, the switch 29 is removed from the contact 27 but engages the contact 28, so that the magnet 19 is deenergized and the magnet 18 energized. When the semaphore drops down to danger position, the switch 29 is removed from both contacts 27 and 28 so that both magnets 18 and 19 are deenergized.

Under clear conditions, the switch 15 being closed shunts the resistance 20, so that the full electrical energy can flow through the track circuit including the secondary transformer winding 21, contact 17, switch 15, conductor 12, rail 11, and conductor 13. The current is of sufficiently high voltage to energize the rail the required amount so that the corresponding responsive or pick-up element of the vehicle equipment can receive a clear impulse from the track. However, under caution conditions, with the magnet 19 deenergized and the switch 15 open, the resistance 20 is interposed in the track circuit which now includes the secondary transformer winding 21, resistance 20, contact 16, switch 14, conductor 12, rail 11 and conductor 13. This will cut down the electrical energy flowing in the rail so that a modified impulse is picked up from the track to obtain caution conditions in the vehicle equipment. When danger conditions exist, both magnets 18 and 19 are deenergized and their switches 14 and 15 open, so that no current will flow in the rail, thereby resulting in the vehicle equipment going to danger condition.

*Vehicle equipment.*

The vehicle equipment includes an electro-magnet 30 controlling an air valve or other device for applying the brakes or otherwise retaining the movement of the vehicle when said magnet is deenergized, a generator or other source of electrical energy 31 to energize said magnet 30 and other magnets of the vehicle equipment, and a speed control switch 32 including the centrifugal governor 33 carrying a movable switch member or brush 34. The normal running or clear circuit of the vehicle equipment includes the generator 31, conductor 35, magnet 30, conductor 36, brush 34, conductor 37, contacts 38 and switch 39, conductor 40, contacts 41 and switch 42, and conductor 43. Both switches 39 and 42 must therefore be closed for clear conditions.

When the switch 39 is open, and the switch 42 closed, a caution circuit is established which includes the speed control switch 32. Such circuit comprises the generator 31, conductor 35, magnet 30, conductor 36, brush 34, a contact strip 44, conductor 40, contacts 41 and switch 42 and conductor 43. The strip 41 is arranged to be engaged by the brush 34 when the vehicle is travelling below a predetermined maximum caution speed, of say from twenty to thirty miles per hour, the governor 33 being connected to a wheel, axle or other part of the vehicle so that the brush 34 is moved in accordance with the vehicle speed. Therefore, when travelling below the maximum caution speed, with the brush 34 engaging the contact strip 44, the caution circuit is closed to keep the magnet 30 energized, but when such speed is exceeded the circuit is broken by the movement of the brush 34 away from the strip 44, thereby deenergizing the magnet 30 and applying the brakes until the speed is reduced below the predetermined maximum under caution conditions. As a result, the vehicle cannot travel above the maximum caution speed under caution conditions.

When both switches 39 and 42 are open, then danger conditions exist in the vehicle equipment, and the caution contact strip 44 is removed from the circuit of the magnet 30, as well as the conductor 43. To provide speed control under danger conditions, a contact 45 is arranged to be engaged by the brush 34 when the vehicle is brought to a stop, and a danger contact strip 46 is arranged to be engaged by the brush 34 when the vehicle travels below a predetermined maximum speed under danger conditions, of for example from ten to fifteen miles per hour. A relay is provided for changing the control from the contact 45 to the contact strip 46 when the vehicle has been brought to a stop, and such relay includes the switch 47 and electro-magnet 48. A conductor 49 connects the contact 45 and magnet 48, and a normally open alert switch 50 is disposed between the magnet 48 and generator 31 and must be held closed by the engineer or operator when travelling under danger conditions. Thus, when the vehicle has come to a stop, by the deenergization of the magnet 30 when both switches 39 and 42 are open, and the switch 50 is held closed by hand, the magnet 48 will be energized, said magnet being normally deenergized to let the switch 47 drop away from the contact 51 connected to the contact strip 46. Accordingly, the magnet 30 will be energized, the circuit including the generator 31, conductor 35, magnet 30, conductor 36, brush 34, contact 45, conductor 49, magnet 48 and switch 50. The switch 47 is therefore raised against the contact 51 to establish the running circuit under danger conditions, such circuit including the generator 31, conductor 35, magnet 30, conductor 36, brush 34, contact strip 46, contact 51, switch 47, magnet 48 and switch 50. The switch 50 must be held closed by the engineer or operator while proceeding under danger conditions, so that he must be alert and ready to stop the vehicle or train in an emergency. Furthermore, if the maximum speed under danger conditions is exceeded, then the vehicle must again come to a stop before it can proceed, because if the brush 34 is lifted from the contact strip 46 by excessive speed under danger conditions, the circuit of the magnets 30 and 48 is broken between said brush and contact strip. This will let the switch 47 drop open away from the contact 51, thereby removing the contact strip 46 from the circuit as well as applying the brakes. The vehicle must then be brought to a stop to allow the brush 34 to engage the contact 45 before the vehicle can proceed, and a stop is therefore enforced whenever the danger speed restriction is not observed.

Electric lamps 52, 53, 54 and 55 may be connected in series with the conductor 37, contact strip 44, contact 45 and contact strip 46, respectively, to indicate the different conditions, and said lamps may be of suitable colors. Thus, the lamp 52 will be lighted under clear conditions, the lamp 53 will be lighted when travelling below the maximum caution speed, and the lamp 54 will be lighted when the vehicle is standing still. The lamp 52 will be extinguished when travelling under caution or danger conditions, and, when travelling under caution conditions, the lamp 53 will be lighted while travelling below the maximum caution speed. Both lamps 52 and 53 will be extinguished when travelling under danger conditions, and when the switch 47 is closed, the lamp 55 is lighted to indicate danger conditions, the lamp 54 being lighted when a stop is made, and the lamp 55 only being lighted when the brush 34 engages the contact strip 46 with the switch 47 held raised by the magnet 48. Other signal devices can be used in lieu of the electric lamps for indicating or displaying the different conditions in the cab of the locomotive or vehicle.

The switches 39 and 42 are held closed when travelling between or beyond control stations, by means of stick relays including the electro-magnets 56 and 57 controlling the respective switches 58 and 59 which carry the insulated switches 39 and 42. The switches 58 and 59 are connected in series with the corresponding magnets 56 and 57 through the contacts 60 and 61, and the switch, contact and magnet of each stick relay is connected in a circuit 62 including a winding or coil 63 of the rail responsive element. The two stick relays of the circuit 62 are connected in parallel, and when either magnet is deenergized to let the corresponding switch drop open, the switch will remain open until raised by some other means inasmuch as the magnet will remain deenergized as long as the switch is open.

The rail responsive element comprises a transformer including the core 64, primary winding or coil 65 thereon and also the secondary winding or coil 63. The primary winding 65 is energized by alternating or pulsating current from the generator 66, to induce alternating or pulsating current in the winding 63 and its circuit 62, the magnets 56 and 57 being alternating current magnets. The rail responsive element moves directly over the rail 11, and has its terminals offset downwardly so as to be disposed closely adjacent to the rail. When the core 64 moves over the iron or magnetic portion of the rail, the rail completes the magnetic circuit of the core 64, with only small air gaps between the core 64 and rail, so that maximum electrical energy is induced in the circuit 62, thereby energizing the magnets 56 and 57 sufficiently to hold the switches 58 and 59 closed, as well as the switches 39 and 42. When the core 64 moves over a non-magnetic rail section 10, the magnetic circuit of the core 64 is broken between the terminals of said core, thereby creating impedance or a choking action in the transformer, and reducing the electrical energy induced in the circuit 62. As a result of the break of the inductive relation between the responsive element and rail, due to the breaking of the magnetic circuit when passing over the non-magnetic rail section, the magnets 56 and 57 are deenergized sufficiently to let the switches 58 and 59 drop, providing said switches are not held closed by other means. Accordingly, both switches 39 and 42 will drop open when passing the non-magnetic rail section, to provide danger conditions unless one or both of the switches 39 and 42 are held closed by other means while the rail-responsive element moves over the non-magnetic rail section. The action to release the switches 39 and 42 when passing a control station is positive and reliable owing to the break in the inductive relation between said device or element and track when said device or element moves over the non-magnetic rail section, which is equivalent to the breaking of a normally closed circuit. In other words, it is necessary that the magnetic circuit of the core 64 be completed by the iron or magnetic portion of the rail in order to keep the magnets 56 and 57 energized sufficiently to hold the switches 58 and 59 closed, and the moment either of said switches drops away from its contact it will remain open until closed by some other means, as will hereinafter more fully appear. The stick relays controlled by the rail-responsive element will therefore open the switches when the rail responsive element passes the non-magnetic rail section, providing the switches are not held closed by the other controlling means.

A receiver or second responsive element is carried by the vehicle, either in front or in rear of the rail responsive element, so as to move over the energized portion of the rail when the rail-responsive element moves over the non-magnetic rail section. Through suitable amplifying or relay connections, the secondary responsive element, which comprises a pick-up or detector coil 67, controls electro-magnets 68 and 69 which control the switches 58 and 59 in addition to the magnets 56 and 57. As shown, radio audions or electrode valves 70 and 71 are employed between the responsive element or coil 67 and the magnets 68 and 69, respectively. The electrical connections are similar to well known radio hook-ups. The conductors 67ˣ of the coil 67 are connected with the audions, each of which has three electrodes. One terminal of the coil 67 is connected to the grids 72 and 73 of the respective audions 70 and 71, while the other terminal of the coil is connected with the filaments 74 and 75 of the corresponding audions, said filaments being energized by batteries 76. The magnets 68 and 69 are connected by the respective conductors 77 and 78 with the plates 79 and 80 of the corresponding audions, and said magnets are connected by the corresponding conductors 81 and 82 with the filaments 74 and 75, both conductors 81 and 82 being connected through the battery 84 which energizes the magnets 68 and 69. Suitable resistance 85 is disposed in the conductors 77 and 78 to regulate the energization of the magnets, and other suitable tuning and adjusting means are provided, such as condensers 86 connected in series with the grids 72 and 73, condensers 87 bridging the filaments and grids, and resistances 88 connected in series with the grids.

The condensers and resistances are so adjusted that when maximum electrical energy flows in the rail 11 (the switch 15 being closed) the coil 67 will pick up sufficient energy from the rail to keep both magnets 68 and 69 energized. It will be understood that the alternating current flowing in the rail will establish or induce alternating magnetic flux in the coil 67 to induce alternating current in the coil 67 resulting in the flow of electrical energy between the grids and filaments of the audions, so that current from the battery 84 can flow through the magnets 68 and 69 and between the plates and filaments of the audions, as well known. However, when the switch 15 is open and the switch 14 closed, so that the resistance 20 cuts down the electrical energy flowing in the rail 11, the coil 67 will pick up less energy from the rail, which will not be sufficient to let the magnet 68 be energized although it will be sufficient to let the magnet 69 be energized. Thus, the resistances and condensers of the audion 70 and magnet 68 are such as to check or retard the flow of current from the battery 84 through the magnet 68 under caution conditions, whereas the audion 71 is energized sufficiently so that current from the battery 84 will energize the magnet 69. When both switches 14 and 15 of the track circuit are open, then the coil 67 will fail to receive energy from the rail and both magnets 68 and 69 will remain deenergized. The magnets 68 and 69 are only energized when the coil 67 receives sufficient electrical energy from the track, and the circuits can be tuned so as to require alternating current of a predetermined frequency, while the resistances will govern the control according to current strength.

Operation.

*Danger conditions.*—When danger track or traffic conditions exist, both track magnets 18 and 19 are deenergized and the switches 14 and 15 open, so that no electrical energy flows in the rail 11 between the conductors 12 and 13. Whether the train or vehicle is travelling under clear, caution or danger conditions, a danger condition will then be established or maintained when passing the control station. Thus, the core 64 passing over the non-magnetic rail section 10 will result in the magnets 56 and 57 being deenergized, and the coil 67 receiving no energy from the rail will result from the magnets 68 and 69 remaining deenergized, so that the switches 58 and 59 will drop or remain open, whichever is the case, and which also applies to the switches 39 and 42 carried by the switches 58 and 59. Consequently, the magnet 30 must be energized by way of the switch 50 and magnet 48 in order to proceed, and the vehicle must be brought to a stop to bring the brush 34 against the contact 45 and the switch 50 must be held closed by the engineer or operator before the magnet 48 is energized, unless the vehicle is already proceeding under danger conditions with the brush 34 engaging the contact strip 46. The magnet 48 being energized will raise the switch 47 and bring the contact strip 46 in the circuit, so that the vehicle can proceed at a slow rate of speed under danger conditions after the vehicle has first been brought to a stop. If the speed is exceeded then the vehicle is again stopped before it can proceed, because the brush 34 being removed from the contact strip 46 will deenergize the magnet 48 as well as the magnet 30 until the vehicle is brought to a stop and the brush 34 is moved against the contact 45 to again reenergize the magnets 30 and 48.

*Clear conditions.*—When the track ahead is clear, both magnets 18 and 19 are energized, and the switches 14 and 15 closed, so that maximum electrical energy will flow in the rail 11. Consequently, when the core 64 moves over the non-magnetic rail section 10, to deenergize the magnets 56 and 57, the coil 67 receives sufficient energy from the rail so that, through the amplifying or translating means, the magnets 68 and 69 are energized to hold the switches 58 and 59 closed during the interval that the magnets 56 and 57 are deenergized. In this way, alternative holding magnets for the stick relay switches 58 and 59 are energized while the magnets 56 and 57 are deenergized, but this requires the reception by the coil 67 of the required electrical energy from the track, and if the track energy fails or is unsuitable then the magnets 68 and 69 will not be energized to hold the switches closed and danger conditions will result. When the magnets 68 and 69 are energized, should the switches 58 and 59 be down, they will be raised so as to establish clear conditions if the train is proceeding under caution or danger conditions. When the switches 39 and 42 are closed the normal running or clear circuit is completed, including the generator 31, conductor 35, magnet 30, conductor 36, brush 34, conductor 37, contacts 38 and switch 39, conductor 40, contacts 41 and switch 42, and conductor 43. The vehicle can then proceed without speed restriction.

Before the coil 67 leaves the energized portion of the rail so that the magnets 68 and 69 are still energized, the core 64 moves from the non-magnetic rail section 10 over the iron or magnetic portion of the rail, so that the magnets 56 and 57 are again energized before the magnets 68 and 69 are deenergized. This provides, under clear conditions, continuous inductive relation between the track and the vehicle equipment. Thus, when the primary or rail-responsive element is moving over the iron or magnetic portion of the rail, the magnets 56 and 57 are energized, due to the inductive relation between the rail responsive element and the rail, whereas when such inductive relation is broken by non-magnetic rail sections then the coil 67 by inductive relation with the track must receive electrical energy from the track to energize the magnets 68 and 69 while the magnets 56 and 57 are deenergized. If both inductive relations between the responsive elements and the track are interrupted then both holding magnets of each pair are deenergized to release the corresponding switches. For running conditions the inductive relation between the vehicle and track is continuous, but the control for clear, caution and danger conditions is intermittent, being effected at control stations depending on the flow of electrical energy in the rail.

*Caution conditions.*—When caution conditions exist, the magnet 19 is deenergized and the magnet 18 energized, so that the current in the track circuit must flow through the resistance 20, which reduces the electrical energy flowing in the rail. When the core 64 moves over the non-magnetic rail section 10, the magnets 56 and 57 are deenergized the same as under clear and danger conditions. The coil 67 receives sufficient energy from the rail to energize the audion or valve 71 sufficiently so that current from the battery 84 will flow through the audion 71 and magnet 69 to energize said magnet sufficiently to hold the switch 59 closed, but the audion 70 does not receive sufficient energy from the coil 67 to enable the magnet 68 to be energized from the battery 84. Consequently, the switches 58 and 39 will drop open, while the switches 59 and 42 will remain closed, or, if the vehicle is proceeding under danger conditions, with switches 58 and 59 open, the switch 58 remains open but the switch 59 is raised by the magnet 69. Therefore, when leaving the control station, the magnet 57 is energized when the rail responsive element moves over the iron or magnetic portion of the rail, but the magnet 56 remains deenergized, the magnet 69 also being deenergized when the coil 67 moves away from the energized portion of the rail.

The caution running circuit is therefore completed, including the generator 31, conductor 35, magnet 30, conductor 36, brush 34, contact strip 44, conductor 40, contacts 41 and switch 42, and conductor 43. This requires that the vehicle must proceed below the predetermined maximum caution speed, inasmuch as the magnet 30 is deenergized and the brakes applied if the brush 34 is removed from the strip 44.

*Reversing device.*

As shown in Fig. 2, a primary and a secondary responsive device is located at each side of the locomotive or vehicle, so as to provide for the travel of the vehicle in either direction, or with either end forward. The primary windings 65 of the transformer rail-responsive elements are connected to the alternating current generator 66, and the secondary windings 63' and 63" are each connected in the circuit 62, while the secondary or pick-up coils 67' and 67" are each connected with the conductors 67× leading to the audions or electrical valves. Contacts 90 are connected in series with the coil or winding 63' and circuit 62, to be bridged by a switch or bridging member 91, and similar contacts 92 are connected in series with the winding 63" and circuit 62 to be bridged by a bridging member 93. Contacts 94 are connected in series with the coil 67' and conductors 67× to be bridged by the bridging member 95, and similar contacts 96 are connected in series with the coil 67" and conductors 67× to be bridged by the bridging member 97. The bridging or switch members 91, 93, 95 and 97 are carried by the reversing lever 98 which is used for reversing the direction of movement of the vehicle or locomotive. When the lever 98 is moved for the movement of the vehicle in one direction, the members 91 and 95 bridge the respective contacts 90 and 94, thereby connecting the winding 63' in the circuit 62 and the coil 67' with the conductors 67× so that the vehicle equipment is controlled from the corresponding side of the track, the winding 63" and coil 67" being cut out from the circuits. When the lever 98 is reversed to reverse the direction of movement of the vehicle, the members 93 and 97 bridge the contacts 92 and 96, respectively, thereby disconnecting the winding 63' and coil 67' from the circuits and connecting the winding 63" and coil 67" in the respective circuits. When the reversing lever 98 is in neutral or intermediate position, all of the responsive elements are disconnected from the devices which they control.

This arrangement will take care of the movement of the locomotive or vehicle with either end forward, inasmuch as when the vehicle is turned around end for end, the reversing lever 98 must be reversed to enable the vehicle to move in the same direction, thereby bringing the control at the same side of the track for the same direction of travel with either end of the vehicle or locomotive forward.

On single track roads, each rail of the track is equipped with the non-magnetic rail sections and with the energizing means, so that one rail provides control for travel in one direction while the other rail provides control for travel in the opposite direction, and by means of the reversing device, the control of the locomotive or vehicle will be at the proper side, with either end of the locomotive or vehicle forward, when travelling in either direction.

*Modification.*

Fig. 3 illustrates a modified primary responsive device which operates magnetically by direct current, thereby eliminating the necessity for a source of alternating current on the vehicle. The responsive device comprises a lever 100 mounted on the fulcrum 101 and carrying a direct current electromagnet 102 which may be energized, as well as the circuit 62, from the direct current generator or other source of electrical energy (not shown). The lever 100 provides a core for the magnet and has an armature 102 to be attracted to the iron or magnetic portion of the rail which will bring the switch 104 against the contacts 105 forming the terminals of the circuit 62, to keep said circuit closed while the responsive device is over the iron or magnetic portion of the rail. However, when passing over the non-magnetic section 10, the armature 103 is released from the rail, the magnetic attraction between the armature and rail being broken, so that the switch 104 drops open, thereby opening the circuit 62. When the responsive device moves from the non-magnetic rail section over the iron or magnetic portion of the rail the armature 103 is again attracted to the rail so as to close the switch 104.

Fig. 3 illustrates a further modification in that a wire or conductor 106 conects the conductors 12 and 13, instead of using the rail, so that the coil 67 will pick up the electrical energy from the wire or conductor 106. Thus, the rail or a separate conductor can be used for the flow of electrical energy to energize the pick-up coil 67 when the circuit 62 is broken by the opening of the switch 104, and the same arrangement may be used for the primary responsive element as shown in the first form of apparatus.

*Neutralizing non-magnetic crossings and the like.*

When the track contains non-magnetic crossings, frogs, switch points, and rail sections between or beyond control stations, it is an easy matter to neutralize the effect thereof on the primary responsive device. Thus, ordinarily, when the primary responsive element moves over any non-magnetic portion of the rail 11, a danger condition is established in the vehicle equipment. With the present apparatus, all that is necessary is to energize the corresponding portion of the rail so that the coil 67 will pick up energy to keep the magnets 68 and 69 energized under clear conditions. Thus, a conductor 108 is connected to a rail 11 at opposite sides of the non-magnetic crossing 107, as seen in Fig. 4, or some other non-magnetic portion of the track, and the conductor 108 is connected by the transformer 109 with the supply line 22, so that current will flow in the rail 11 to offset or neutralize the effect of the non-magnetic portion. This arrangement can be used at non-magnetic crossings, frogs, switch points, and the like, and also for non-magnetic portions of the rail between or beyond control stations. If the non-magnetic portions of the track are between control stations, then the current flowing in the conductor 108 and corresponding portion of the rail should be controlled by relays and resistance, such as used between the conductors 12 and 13, as shown in Fig. 1, in order that the different conditions of vehicle control will be maintained. In this way, non-magnetic portions of the rail in a block can be used for supplemental control stations or sub-stations in the same way as the control station shown in Fig. 1, or such sub-stations can be provided in each block and controlled from the main control station, signal circuit or semaphore, in order to facilitate traffic.

The various circuits are on the normal closed circuit plan, so that failure of current, breaking of the circuits, short circuits, ground connections, and the like, will produce danger conditions, whereby failures are on the side of safety.

Having thus described the invention, what is claimed as new is:—

1. Vehicle controlling apparatus comprising a non-magnetic section in the vehicle track at each control station, vehicle-carried rail-responsive means inductively related with the track for obtaining an interruption in said inductive relation whenever said means passes a non-magnetic track section, a track side circuit including a portion extending longitudinally of the track and means for controlling the flow of current in the circuit, a vehicle-carried pick-up coil co-operable inductively with said portion of the trackside circuit when the rail-responsive means passes the non-magnetic track section, and vehicle controlling means controlled by said rail-responsive means and coil for obtaining one vehicle condition when said interruption of inductive relation occurs without said coil picking up energy from the trackside circuit, and for obtaining another vehicle condition when said coil picks up energy from said trackside circuit during such interruption of inductive relation.

2. Vehicle controlling apparatus comprising a non-magnetic section in the vehicle track, vehicle controlling means having an inductive relation with the track for obtaining an interruption in said inductive relation when passing a non-magnetic track section to obtain a predetermined vehicle condition, a trackside circuit for each of said non-magnetic track sections having a portion extending longitudinally of the track and having controlling means, and a pick-up coil on the vehicle co-operable inductively with said portion of the trackside circuit during such interruption in inductive relation and controlling said vehicle controlling means to avoid said condition when said coil receives energy from the trackside circuit.

3. Vehicle controlling apparatus comprising a non-magnetic section in a rail of the vehicle track at each control station, vehicle-carried rail-responsive means inductively related with said rail for obtaining an interruption in said inductive relation whenever said means passes a non-magnetic rail section, means for energizing a rail of the track at each control station, vehicle-carried means for picking up energy from said energized rail, and vehicle controlling means controlled by the first and third named means for obtaining one vehicle condition when said interruption of inductive relation occurs without the thirdnamed means picking up eneregy from the rail, and for obtaining another vehicle condition when the thirdnamed means picks up energy from the rail during said interruption of inductive relation.

4. Vehicle controlling apparatus comprising a non-magnetic section in a rail of the vehicle track at each control station, vehicle-carried rail-responsive means inductively related with said rail for obtaining an interruption in said inductive relation whenever said means passes a non-magnetic rail section, means for energizing a rail of the track at each control station for different conditions, vehicle-carried means for picking up energy from the energized rail, and vehicle controlling means controlled by the first and thirdnamed means for obtaining one vehicle condition when said interruption of inductive relation occurs without the thirdnamed means picking up energy from the rail, and for obtaining other vehicle conditions selectively when the thirdnamed means picks up energy from the rail, when energized for different conditions, during said interruption of inductive relation.

5. Vehicle controlling apparatus comprising non-magnetic sections in the vehicle track, vehicle-carried responsive means having an inductive relation with the track for obtaining an interruption in said inductive relation whenever said means passes a non-magnetic track section, vehicle controlling means for obtaining a predetermined vehicle condition when said responsive means is affected by said interruption in inductive relation, and means for avoiding such vehicle condition including means for energizing the track where the non-magnetic sections are located, and receiving means on the vehicle to be influenced by such energized portions of the track and controlling the vehicle controlling means to avoid the aforesaid vehicle condition.

6. Vehicle controlling apparatus comprising a non-magnetic section in the rail of the vehicle track at each control station, vehicle-carried rail-responsive means inductively related with said rail for obtaining an interruption in said inductive relation whenever said means passes a non-magnetic rail section, a track circuit including a portion of a rail of the track and controlling means, vehicle-carried means for picking up energy from said portion of the rail included in said circuit, and vehicle controlling means controlled by the first and thirdnamed means for obtaining one vehicle condition when said interruption of inductive relation occurs without the thirdnamed means picking up energy from the rail, and for obtaining another vehicle condition when the thirdnamed means picks up energy from the rail during said interrution of inductive relation.

7. Vehicle controlling apparatus comprising a non-magnetic section in a rail of the vehicle track at each control station, vehicle-carried rail-responsive means inductively related with said rail for obtaining an interruption in said inductive relation whenever said means passes a non-magnetic rail section, a track circuit including a portion of a rail of the track and means for varying the current flowing in said circuit, vehicle-carried means for picking up energy from the portion of the rail included in said circuit, and vehicle controlling means controlled by the first and thirdnamed means for obtaining one vehicle condition when said interruption of inductive relation occurs without the thirdnamed means picking up energy from the rail, and for obtaining other vehicle conditions selectively when the thirdnamed means picks up different degrees of energy from the rail during said interruption of inductive relation.

8. Vehicle controlling apparatus comprising a non-magnetic section in a rail of the track at each control station, vehicle-carried rail-responsive means inductively related with said rail for obtaining an interruption in said inductive relation whenever said means passes a non-magnetic rail section, a stick relay controlled by said means to be released when said interruption in inductive relation occurs, vehicle controlling means controlled by said relay, means for energizing a rail of the track at each control station, and vehicle-carried responsive means for picking up energy from said energized rail and preventing the release of said relay during said interruption in inductive relation.

9. Vehicle controlling apparatus comprising a non-magnetic section in a rail of the track of the vehicle at each control station, vehicle-carried rail-responsive means inductively related with said rail for obtaining an interruption in said inductive relation whenever said means passes a non-magnetic rail section, a plurality of stick relays controlled by said means to be released when said interruption in inductive relation occurs, means on the track at each control station for supplying different degrees of electrical energy, vehicle controlling means controlled by said relays for obtaining different vehicle conditions when different relays are released, and vehicle-carried means for picking up energy from said means on the track and controlling said relays to prevent the release of the different relays according to the degree of energy received from the track.

10. Vehicle controlling apparatus comprising a trackside circuit including a portion of a rail of the track for a desired distance, means for supplying said circuit with electrical energy and controlling the flow of energy therein, a vehicle-carried pick-up coil cooperable inductively with said rail, vehicle-carried controlling means, electrical means controlled by said coil and controlling said controlling means, and additional means, for use in intermittent operation, operable to prevent control of said controlling means from said coil and operable whenever passing a predetermined location of the track between the limits of said portion of the rail to place the control of the controlling means on said coil.

11. Vehicle controlling apparatus comprising a trackside circuit including a portion of a rail of the track for a desired distance, means for supplying said circuit with electrical energy and for controlling the circuit to modify the electrical energy therein, a vehicle-carried pick-up device co-operable inductively with said rail, vehicle-carried controlling means, means controlled electrically by said device and controlling said controlling means for obtaining various conditions of control by different energizations of said circuit, and additional means, for obtaining intermittent control, operable to prevent control of said controlling means from said device excepting at a predetermined location of the track.

12. Vehicle controlling apparatus comprising a trackside circuit including a portion of a rail of the track for a desired distance, means for supplying said circuit with electrical energy and controlling the flow of energy therein, a vehicle-carried pick-up coil cooperable inductively with said rail, vehicle-carried controlling means, electrical means controlled by said coil and controlling said controlling means, and additional means, to obtain intermittent control, operable to prevent control of said controlling means from said coil, including a controlling inductor on the vehicle and an element for influencing said inductor and disposed on the track at the control location.

13. Vehicle controlling apparatus comprising a trackside circuit including a portion of a rail of the track for a desired distance, means for supplying said circuit with electrical energy and controlling the flow of energy in said circuit, a vehicle-carried pick-up coil cooperable inductively with said rail, vehicle-carried controlling means including a movable member, electrical means controlled by said coil and controlling said member to release said member when said coil fails to receive the required energy from the trackside circuit, and additional means normally holding said member against releasing movement and operable to release said member whenever the vehicle passes a control location of the track with said coil between the limits of said portion of said rail.

14. Vehicle controlling apparatus comprising a trackside circuit including a portion of a rail of the track for a desired distance, means for supplying said circuit with electrical energy and controlling the flow of energy in said circuit, a vehicle-carried pick-up coil cooperable inductively with said rail, vehicle-carried controlling means including a movable member, electrical means controlled by said coil and controlling said member to release said member when said coil fails to receive the required energy from the trackside circuit, a vehicle-carried inductor, means controlled by said inductor for normally holding said member against releasing movement, and means on the track with which the inductor is cooperable when passing a control location with said coil between the limits of said portion of said rail, for influencing the last-named means to release said member.

15. Vehicle controlling apparatus including a trackside circuit including a portion of a rail of the track for a desired distance, means for supplying said circuit with electrical energy and controlling the flow of energy therein, vehicle-carried controlling means, a plurality of electrical devices controlling said controlling means for obtaining different controlling conditions, a vehicle-carried pick-up device cooperable with said rail, and electrical connections between said devices and adjusted for controlling the first-named devices differently by differences in electrical energy in said circuit.

16. In a vehicle controlling apparatus, a rail of the vehicle track having a portion of manganese or equivalent material therein, an electrical conductor bridging said portion and connected to said rail beyond the opposite ends of said portion, and means in said conductor for energizing a trackside circuit including said conductor and said portion of the rail.

17. In a vehicle controlling apparatus, a rail of the vehicle track having a portion of manganese or equivalent material therein, an electrical conductor bridging said portion and connected to the rail beyond the opposite ends of said portion, and means for energizing said conductor so that current flows in said rail, in combination with vehicle carried means inductively affected by said portion of the rail and by current flowing in the rail.

18. In a vehicle control apparatus, the combination with a vehicle track having non-magnetic sections at control locations, of trackside circuits for said control locations having controlling means, vehicle controlling means operable for restrictive speed conditions, means having inductive relation with the track for obtaining an interruption in said inductive relation whenever passing one of said non-magnetic sections and controlling said vehicle controlling means to obtain said conditions whenever such interruption of inductive relation occurs, and means normally inactive when travelling between control locations and cooperable inductively with the corresponding trackside circuits to receive energy therefrom by induction when passing the control locations and controlling said controlling means to nullify the restrictive speed conditions thereof when the trackside circuits are closed.

19. In a vehicle control apparatus, the combination with a vehicle track having non-magnetic sections at control locations, of trackside circuits for said control locations having controlling means, normally energized electrical controlling means for obtaining restrictive speed conditions when deenergized, means having inductive relation with the track for obtaining an interruption in said inductive relation whenever passing one of said non-magnetic sections and controlling said controlling means to deenergize same whenever such interruption of inductive relation occurs, and means normally inactive when travelling between control locations and cooperable inductively with the corresponding trackside circuits to receive energy therefrom by induction when passing the control locations and controlling said controlling means to prevent deenergization thereof when the trackside circuits are closed.

20. In a vehicle control apparatus, the combination with a vehicle track having non-magnetic sections at control locations, of trackside circuits for said control locations having controlling means, vehicle controlling means including an electrical circuit which when broken obtains restrictive speed conditions, means having inductive relation with the track for obtaining an interruption in said inductive relation whenever passing one of said non-magnetic sections and controlling said circuit to break said circuit whenever said interruption in inductive relation occurs, and means normally inactive when travelling between control locations and cooperable inductively with the corresponding trackside circuits to receive energy therefrom by induction when passing the control locations and controlling said circuit to keep same closed when the trackside circuits are closed.

21. In a vehicle control apparatus, the combination with a vehicle track having non-magnetic sections at control locations, of trackside circuits for said control locations having controlling means, vehicle controlling means including a normally closed circuit, means having inductive relation with the track for breaking said circuit when the inductive relation is interrupted in passing one of said non-magnetic sections, and normally inactive means cooperable inductively with the corresponding trackside circuits to receive energy therefrom by induction when passing the control locations for keeping said circuit closed when the trackside circuits are closed.

22. In a vehicle control apparatus, the combination with a vehicle track having non-magnetic sections at control locations, of trackside circuits for said control locations having controlling means, normally energized vehicle controlling means, vehicle-carried inductive means controlling said controlling means and having inductive relation with the track and the trackside circuits, means controlled by said inductive means for deenergizing the controlling means when the inductive relation is interrupted by a non-magnetic section with the corresponding trackside circuit open, and means normally inactive and controlled by said inductive means to energize the controlling means when the trackside circuits are closed and energized.

In testimony whereof I hereunto affix my signature.

ALFRED L. RUTHVEN.